(12) United States Patent
Qi et al.

(10) Patent No.: US 7,952,989 B2
(45) Date of Patent: May 31, 2011

(54) PERMUTING SLOTS TO LOGICAL DISTRIBUTED RESOURCE UNITS

(75) Inventors: Xin Qi, Beijing (CN); Chao Wei, Beijing (CN); Shaohua Li, Beijing (CN)

(73) Assignee: Nokia Siemens Networks OY, Espoo (FI)

(*) Notice: Subject to any disclaimer, the term of this patent is extended or adjusted under 35 U.S.C. 154(b) by 133 days.

(21) Appl. No.: 12/421,538

(22) Filed: Apr. 9, 2009

(65) Prior Publication Data

US 2009/0257343 A1 Oct. 15, 2009

Related U.S. Application Data

(60) Provisional application No. 61/123,599, filed on Apr. 9, 2008, provisional application No. 61/110,975, filed on Nov. 3, 2008.

(51) Int. Cl.
*H04J 11/00* (2006.01)
(52) U.S. Cl. ........ 370/208; 370/329; 370/330; 370/342; 455/450
(58) Field of Classification Search ............ 370/208, 370/329, 330, 342; 455/450
See application file for complete search history.

(56) References Cited

U.S. PATENT DOCUMENTS

| 2004/0190640 A1 | 9/2004 | Dubue et al. | |
|---|---|---|---|
| 2007/0223440 A1* | 9/2007 | Ho et al. | 370/342 |
| 2009/0149188 A1* | 6/2009 | McBeath et al. | 455/450 |
| 2009/0285168 A1* | 11/2009 | Choi et al. | 370/329 |
| 2010/0254342 A1* | 10/2010 | Cho et al. | 370/330 |

FOREIGN PATENT DOCUMENTS

WO 2006/000091 A1 1/2006

OTHER PUBLICATIONS

Part 16: Air Interface for Broadband Wireless Access Systems, Draft Standard for Local and Metropolitan Area Networks, P802.15Rev2/D3, IEEE WirelessMan 802.16, IEEE Computer Society and the IEEE Microwave Theory and Techniques Society, Feb. 2008 (29 pages).*
International Search Report and Written Opinion for International Application No. PCT/EP2009/054313, mailed on Nov. 27, 2009, 11 pages.

* cited by examiner

*Primary Examiner* — Albert T Chou
(74) *Attorney, Agent, or Firm* — Brake Hughes Bellermann LLP

(57) ABSTRACT

Various example embodiments are disclosed. According to an example embodiment, a method may comprise sending, by a sending wireless station in a wireless network, data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier.

20 Claims, 13 Drawing Sheets

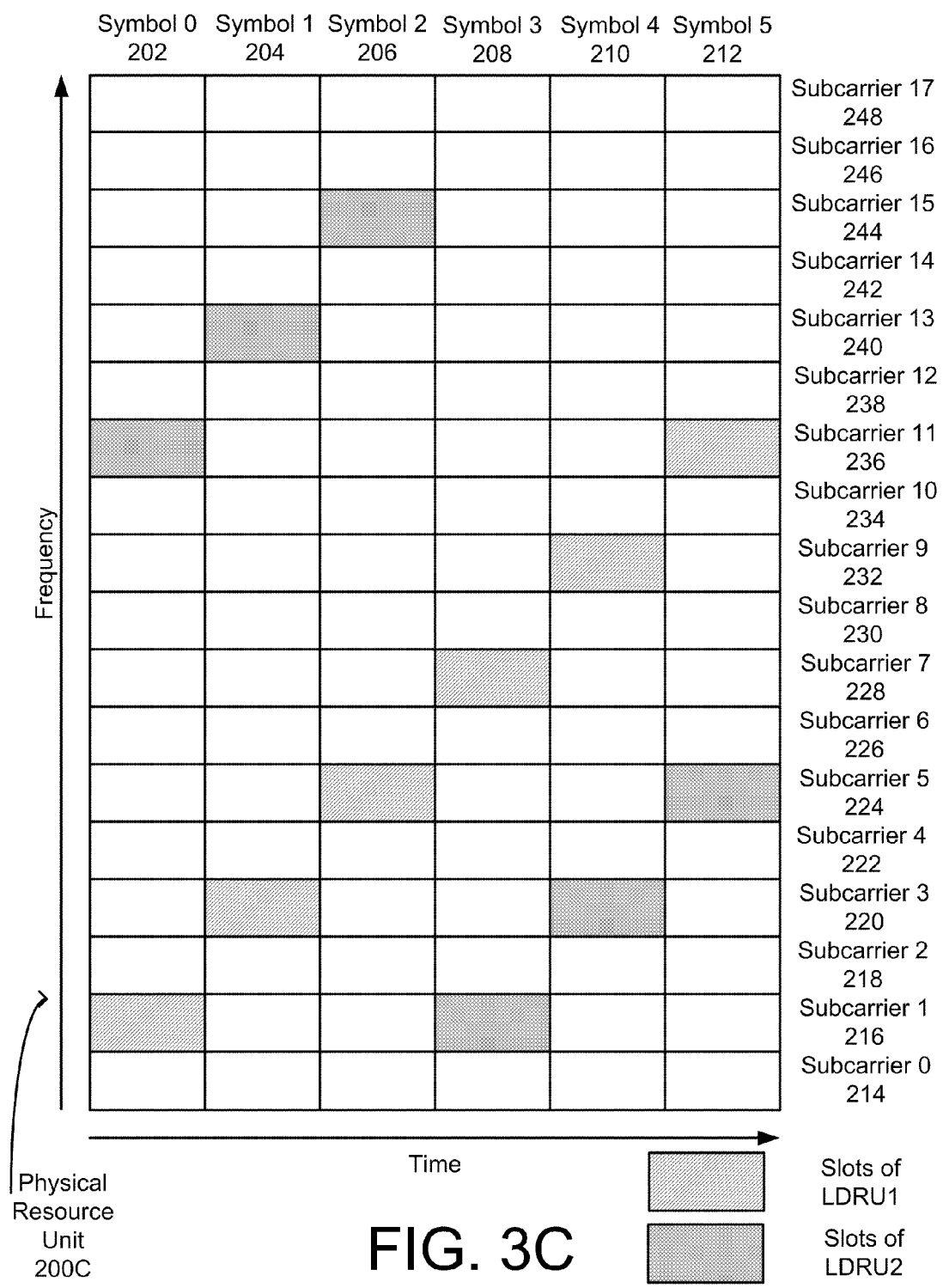

1

PERMUTING SLOTS TO LOGICAL DISTRIBUTED RESOURCE UNITS

PRIORITY CLAIM

This application claims the benefit of priority based on U.S. Provisional Patent App. No. 61/123,599, entitled, "Method, Apparatus, and Computer Program for Permutation of Downlink Distributed Resource Allocation," filed on Apr. 9, 2008, and U.S. Provisional Patent App. No. 61/110,975, entitled, "Permuting Slots to Logical Distributed Resource Units," filed on Nov. 3, 2008, the disclosures of both of which are hereby incorporated by reference.

TECHNICAL FIELD

This description relates to wireless networks.

BACKGROUND

In wireless networks, subcarriers may be mapped to logical distributed resource units (LDRUs), and wireless stations within the wireless network may communicate via the LDRUs.

SUMMARY

According to an example embodiment, a method may comprise sending, by a sending wireless station in a wireless network, data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier.

According to another example embodiment, an, apparatus may include a processor. The processor may be configured to generate a message including data for a wireless transceiver to send to a wireless station over an air interface via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier.

According to another example embodiment, a computer program product for a sending wireless station in a wireless network, may be tangibly embodied on a computer storage medium and include executable code. When executed, the code may be configured to cause the sending wireless station to send data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier.

The details of one or more implementations are set forth in the accompanying drawings and the description below. Other features will be apparent from the description and drawings, and from the claims.

BRIEF DESCRIPTION OF THE DRAWINGS

FIGS. 3C and 3D show a permutation of slots to logical distributed resource units (LDRUs) within a first physical resource unit and a second physical resource unit according to an example embodiment.

DETAILED DESCRIPTION

Figure 1A:
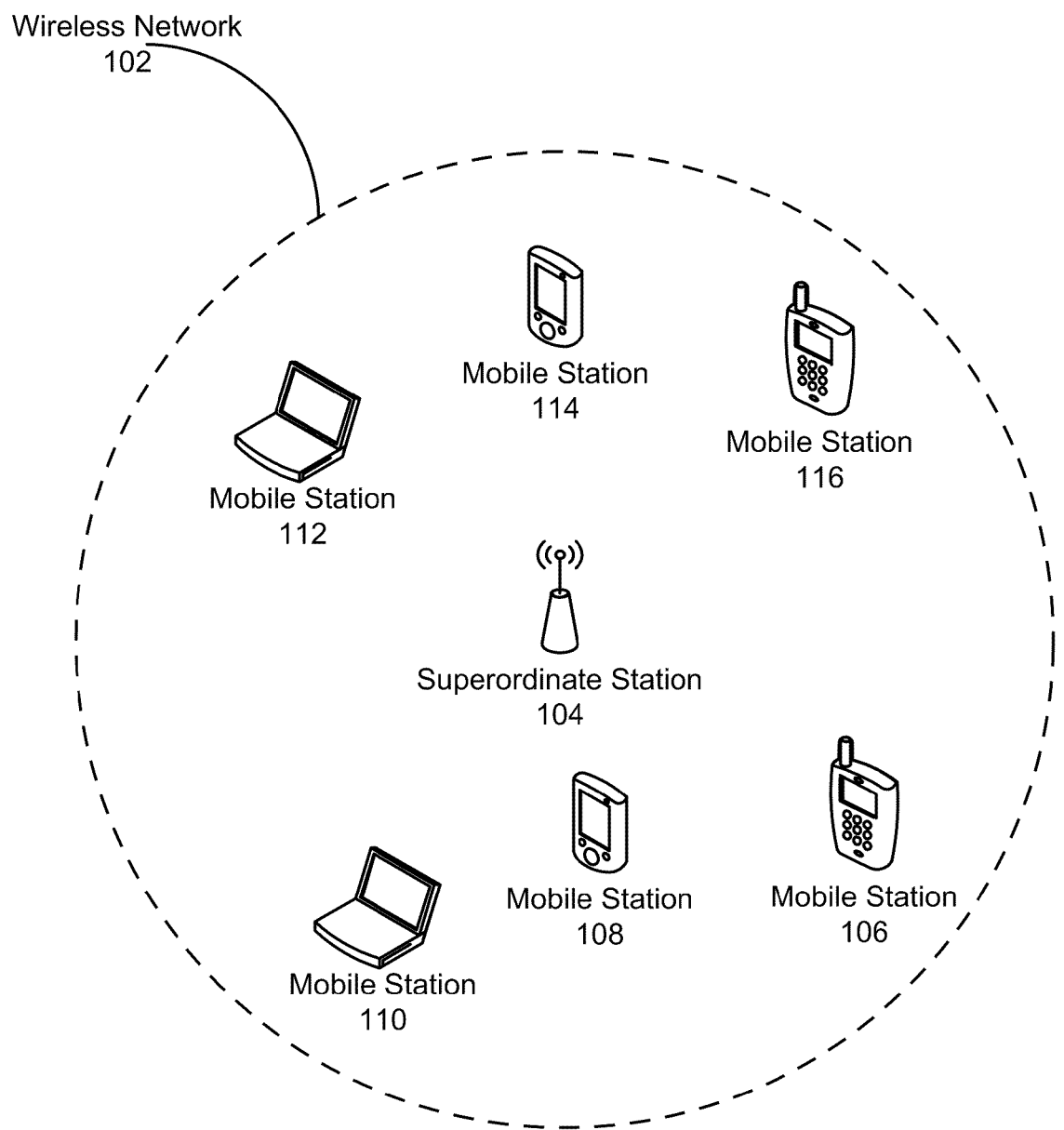
FIG. 1A shows a wireless network according to an example embodiment.

FIG. 1A shows a wireless network 102 according to an example embodiment. The wireless network 102 may include, for example, an IEEE 802.16 Worldwide Interoperability for Microwave Access (WiMAX) network, a Third Generation Partnership Project (3GPP) Long Term Evolution (LTE) network, an IEEE 802.11 Wireless Local Area Network (WLAN), or a cellular telephone network, according to example embodiments. The wireless network 102 may provide wireless data stations to users or subscribers who enter the wireless network 102.

The wireless network 102 may include a superordinate station 104. The superordinate station 104 may provide wireless (or unguided) data and/or voice service to mobile stations 106, 108, 110, 112, 114, 116 via an air interface. The superordinate station 104 may, for example, send data to the mole stations 106, 108, 110, 112, 114, 116 in a downlink (DL) direction, and may receive data from the mobile stations 106, 108, 110, 112, 114, 116 in an uplink (UL) direction. The superordinate station 104 may include a base station, node B, or access point, according to example embodiments. The superordinate station 104 may connected to a data network, such as the Internet, via a wired or guided connection to a backhaul network.

Figure 1B:
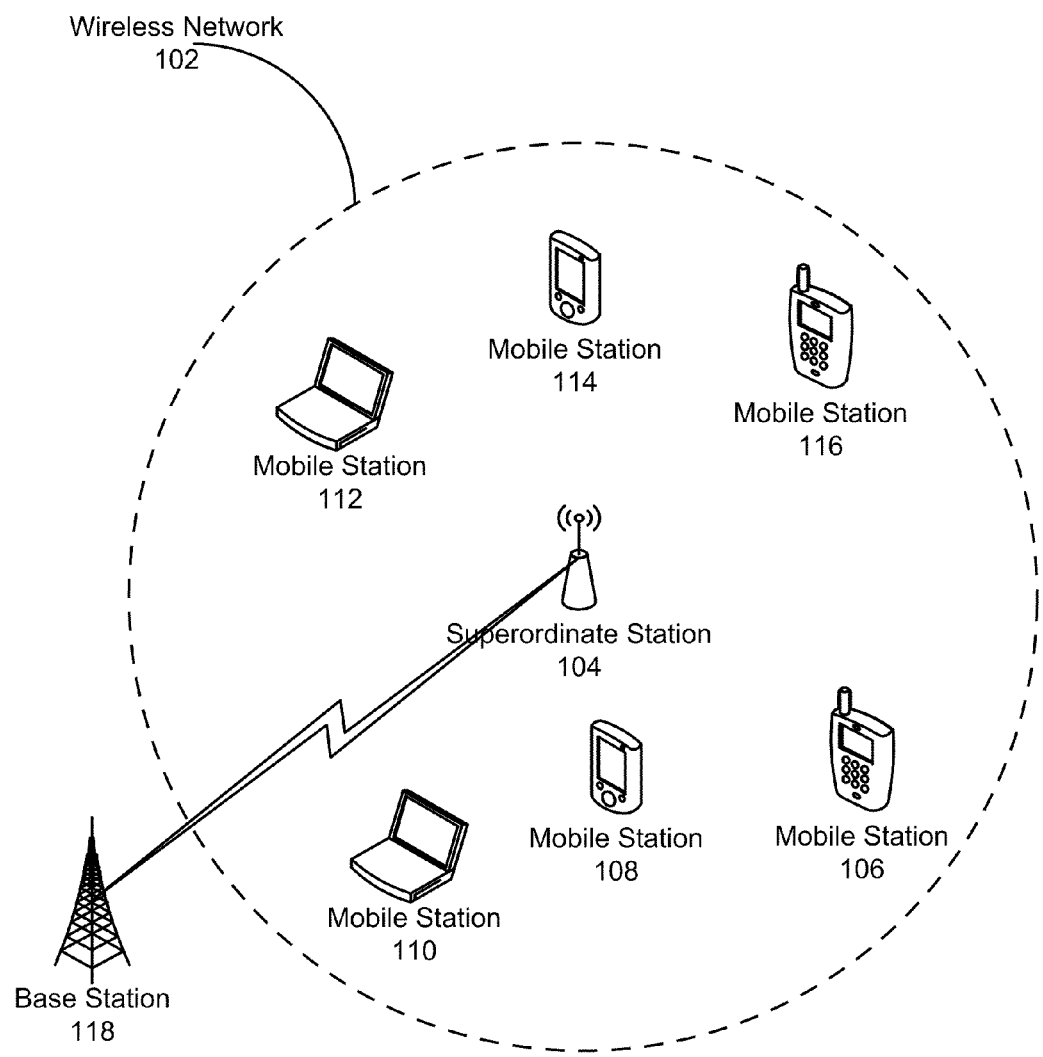
FIG. 1B shows a wireless network according to another example embodiment.

FIG. 1B shows a wireless network 102 according to another example embodiment. In this example, the superordinate station 104 may include a relay station. The superordinate station 104 may provide data and/or voice service to the mobile stations 106, 108, 110, 112, 114, 116, as described above with reference to FIG. 1A. However, in this example, the superordinate station 104 may not be directly connected to the data network or Internet, but instead may be in wireless or unguided communication with a base station 118 (or with another relay station which may be in communication with the base station 118 directly via an air interface or via one or more additional relay stations) via an air interface. The base station 118 may be connected to the data network or Internet via the wired or guided connection to the backhaul network, thereby providing the superordinate station 104 or relay station with access to the data network or Internet.

Referring to either FIG. 1A or FIG. 1B, the mobile stations 106, 108, 110, 112, 114, 116 may provide data service to a user or subscriber by wirelessly (or without a guided medium) communicating with the superordinate station 104 via the air interface. The mobile stations 106, 108, 110, 112, 114, 116 may include cellular telephones, personal digital assistants (PDAs), smartphones, laptop or notebook computers, or other portable devices capable of processing data, receiving input from and providing output to a user, and communicating with the superordinate station 104 via the air interface. The mobile stations 106, 108, 110, 112, 114, 116 may send data to the superordinate station 104 in the uplink (UL) direction, and may receive data from the superordinate station 104 in the downlink direction.

The wireless network 102 may control access to the communication medium, such as the air interface, by allocating time slots to each of the mobile stations 106, 108, 110, 112, 114, 116 in a time domain, and/or one or more carrier frequencies with specified bandwidths to each of the mobile stations 106, 108, 110, 112, 114, 116 in a frequency domain. The wireless network 102 may, for example, assign slots to each of the mobile stations 106, 108, 110, 112, 114, 116 for communication with the superordinate station 104 in each of the uplink and downlink directions. Slots may include a time slot and a carrier frequency with a specified bandwidth for sending or receiving data.

Figure 2:
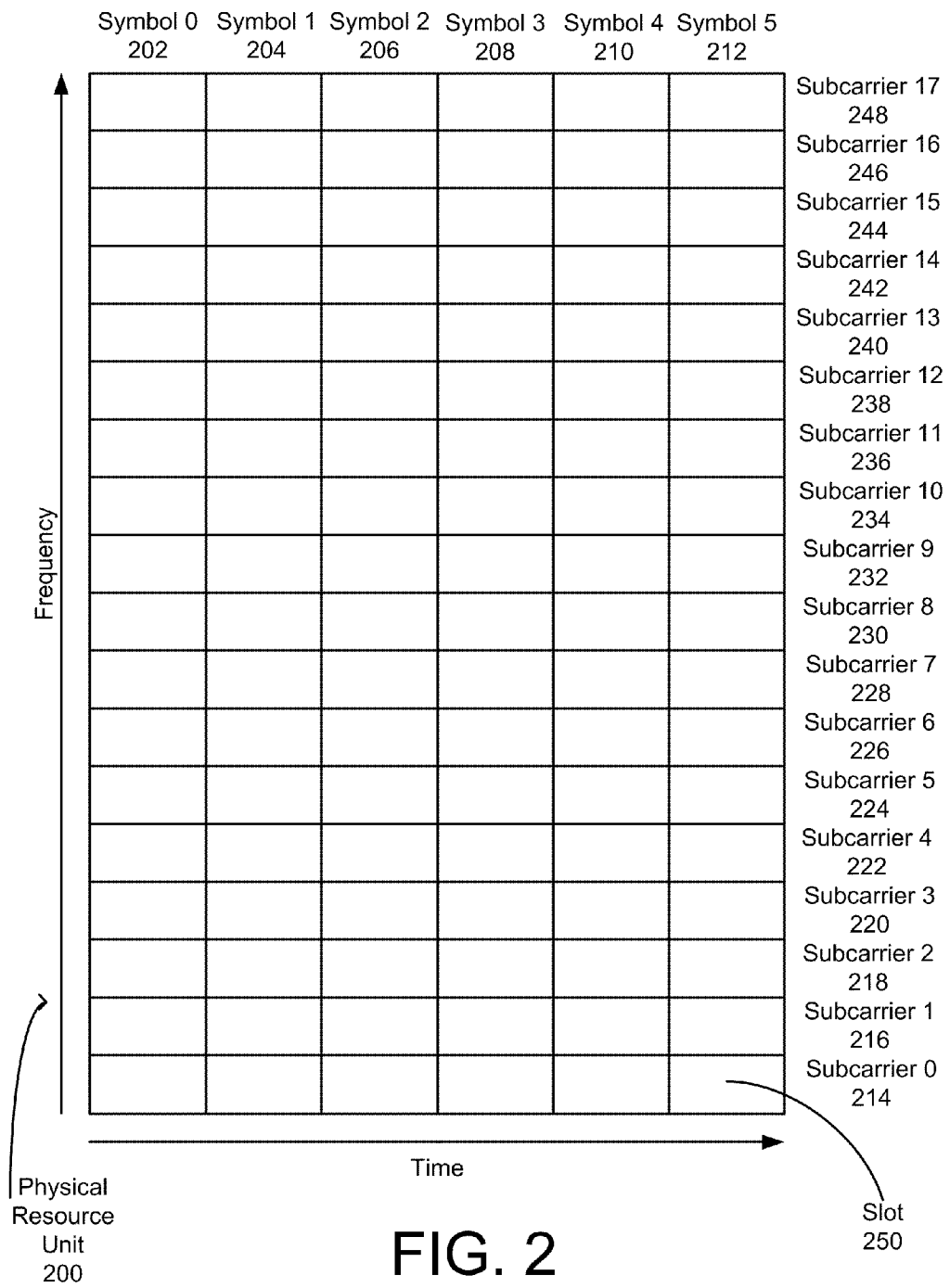
FIG. 2 shows a map of physical resource units according to an example embodiment.

FIG. 2 shows a map of slots 250 within a physical resource unit 200 according to an example embodiment. According to this example, the slots 250 in the wireless network 102 may be allocated to the mobile stations 106, 108, 110, 112, 114, 116 according to an orthogonal frequency division multiple access (OFDMA) method. In this example, data may be transmitted as symbols 202, 204, 206, 208, 210, 212 during specified time slots. The symbols 202, 204, 206, 208, 210, 212 may be specified in a periodic manner, such as a symbol 0 which is the first symbol in each group of six symbols, a symbol 1 which is the second symbol in each group of six symbols, etcetera. While the example shown in FIG. 2 shows six symbols 202, 204, 206, 208, 210, 212, any number of symbols may be used.

Also in this example, the frequency spectrum may be divided into a plurality of subcarriers 214, 216, 218, 220, 222, 224, 226, 228, 230, 232, 234, 236, 238, 240, 242, 244, 246, 248. While eighteen subcarriers 214, 216, 218, 220, 222, 224, 226, 228, 230, 232, 234, 236, 238, 240, 242, 244, 246, 248 are included in the example physical resource unit 200 shown in FIG. 2, any number of subcarriers 214, 216, 218, 220, 222, 224, 226, 228, 230, 232, 234, 236, 238, 240, 242, 244, 246, 248 may be included in a physical resource unit 200. The subcarriers may be specified sequentially, such as in either ascending or descending frequency order. The subcarriers may include specified carrier frequencies with specified bandwidths, such as 5 kHz, 10 kHz, or 15 kHz. These are merely examples. While eighteen subcarriers are shown in FIG. 2, any number of subcarriers may be allocated in the wireless network 102. A continuous group of subcarriers 214, 216, 218, 220, 222, 224, 226, 228, 230, 232, 234, 236, 238, 240, 242, 244, 246, 248 may make up a "carrier." For example, one thousand 10 kHz subcarriers 214, 216, 218, 220, 222, 224, 226, 228, 230, 232, 234, 236, 238, 240, 242, 244, 246, 248 may make up one 10 MHz carrier, with the 10 MHz carrier having a bandwidth of 10 MHz. Carriers may also have bandwidths other than 10 MHz. Slots 250 may be allocated within a single such carrier, or within multiple carriers (i.e., the multiple carriers would occupy frequency bands which are not adjacent to each other), according to example embodiments.

Data may be transmitted via the slots 250 allocated to the mobile stations 106, 108, 110, 112, 114, 116. The slots 250 may be allocated by specifying the symbol numbers and subcarriers via which data will be sent or received. In an example embodiment, the slots 250 may be mapped to logical distributed resource units (LDRUs). The LDRUs may each identify a plurality of slots 250 by a single number (such as an index of the LDRU), rather than by pairs of numbers (the time slot or symbol and the carrier frequency, subcarrier, or subchannel). The network 102, such as via the superordinate station 104, may communicate to the mobile stations 106, 108, 110, 112, 114, 116 the slots 250 via which the mobile stations 106, 108, 110, 112, 114, 116 will send and receive data by sending allocation messages to the mobile stations 106, 108, 110, 112, 114, 116 which include the LDRUs. The LDRUs allocated to a particular mobile station 106, 108, 110, 112, 114, 116 may indicate the slots 250 via which the mobile station 106, 108, 110, 112, 114, 116 will communicate with the superordinate station 104 in the uplink and/or downlink direction. The mobile stations 106, 108, 110, 112, 114, 116 may map the logical resource units to the slots 250 which will be used to transmit or receive data.

In order to achieve frequency and/or time diversity in data and/or pilot transmission and reception, the LDRUs may be mapped to the slots 250 by a permutation. The wireless network 102, as well as the superordinate station 104 and/or mobile stations 106, 108, 110, 112, 114, 116, may permute the slots 250 into LDRUs. The permutation may be performed in such a manner that data transmitted via sequential symbols 202, 204, 206, 208, 210, 212 will be transmitted via noncontiguous subcarriers 214, 216, 218, 220, 222, 224, 226, 228, 230, 232, 234, 236, 238, 240, 242, 244, 246, 248. Noncontiguous subcarriers 214, 216, 218, 220, 222, 224, 226, 228, 230, 232, 234, 236, 238, 240, 242, 244, 246, 248 may include subcarriers 214, 216, 218, 220, 222, 224, 226, 228, 230, 232, 234, 236, 238, 240, 242, 244, 246, 248 which are not adjacent to each other frequency domain (are not adjacent subcarriers, or do not occupy a continuous bandwidth).

Example embodiments described herein provide a new permutation scheme for distributed resource allocation which is particularly advantageous with the physical resource units agreed for 802.16 m WiMAX. The distributed resource allocation may utilize frequency diversity to improve link-level performance and certain embodiments reduce the volume of feedback information for scheduling, which has similar meaning with the PUSC and FUSC in certain 802.16 specifications, such as IEEE 802.16Rev2/D3.

In WiMAX, distributed resource allocation (DRA) may utilize frequency diversity to improve link-level performance and to reduce the volume of feedback information for scheduling. Localized resource allocation (LRA) is intended to do channel-aware scheduling to improve system throughput or performance. PUSC and FUSC in the 802.16e standard belong to DRA, while AMC in the 802.16e standard belongs to LRA.

Figure 3A:
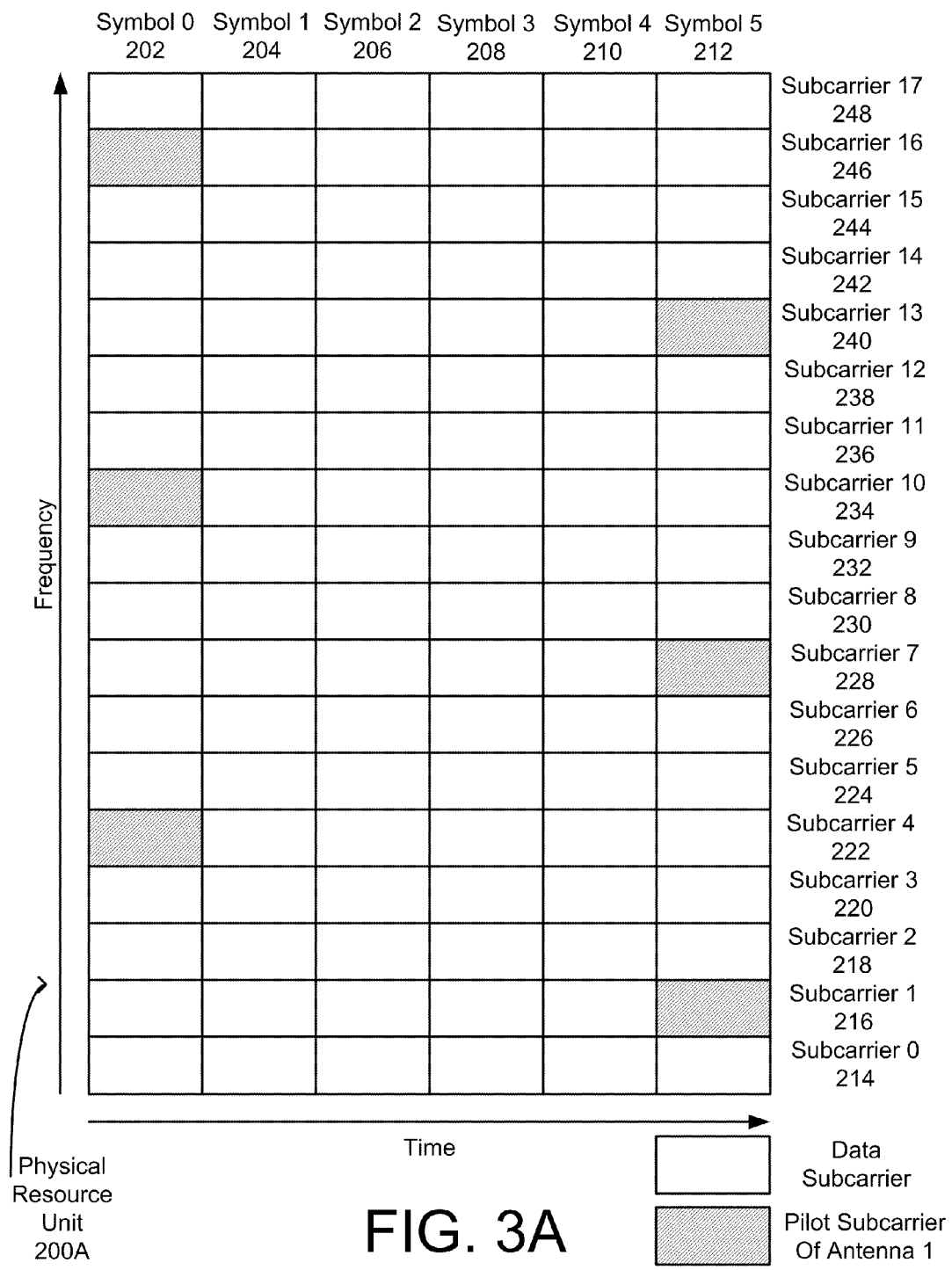
FIG. 3A shows slots within a physical resource unit allocated for pilots of a transmit antenna according to an example embodiment.
Figure 3B:
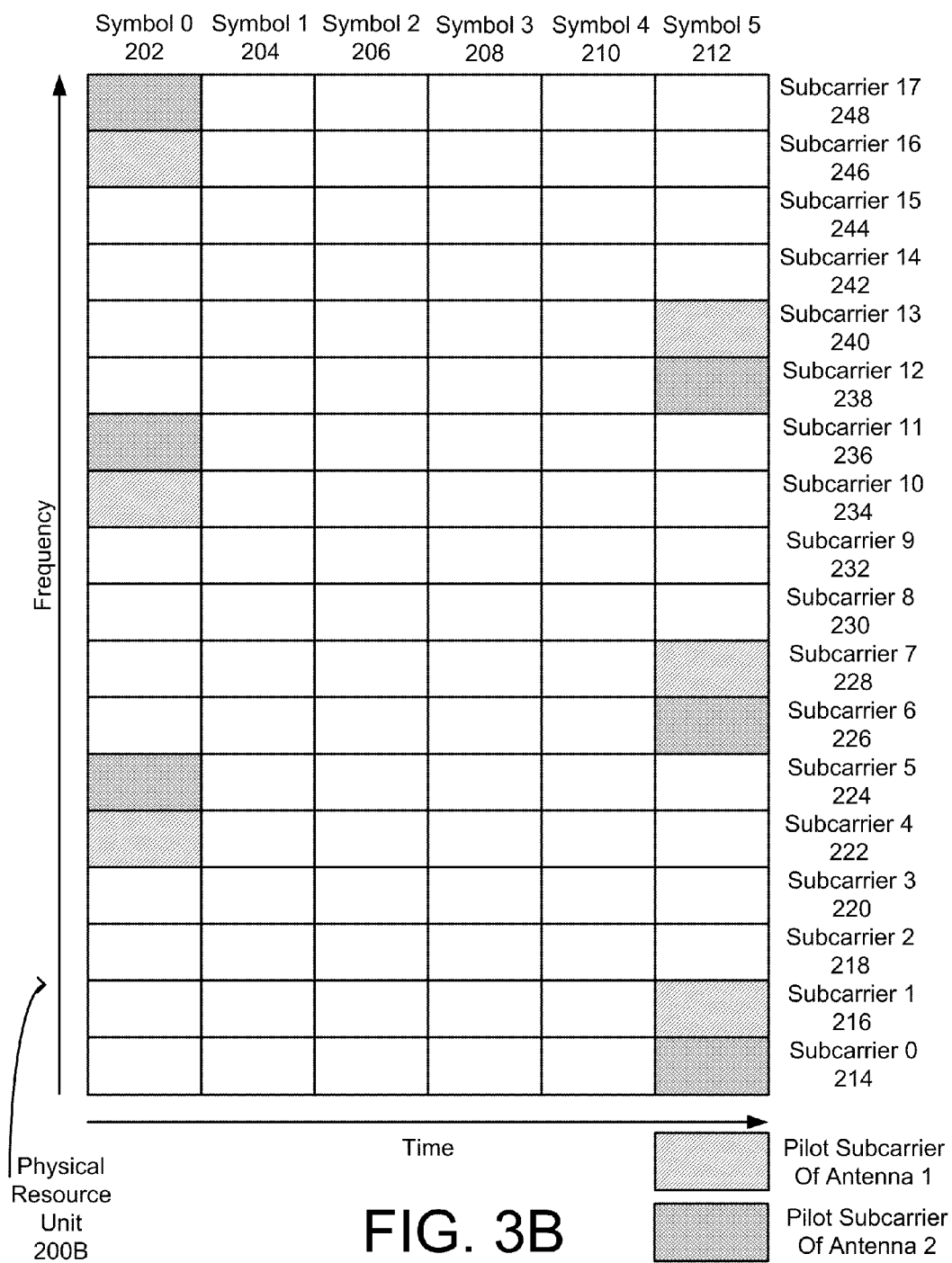
FIG. 3B shows slots within a physical resource unit allocated for pilots of two transmit antennas according to an example embodiment.

The following nomenclature is used in the examples and description made with reference to FIGS. 3A and 3B, and to other examples and description to the extent not inconsistent thereto. Letter variables may positive integers at least equal to one. Each basic physical resource unit 200 (for localized resource allocation) may be a block of N*M adjacent subcarriers in frequency-time domain, where N is the number of subcarriers per OFDMA symbol and M is the number of OFDMA symbols. There may be $N_{RB}$ basic physical resource units 200 in total (e.g., assuming for one specific example that there are 1024 subcarriers in total and 864 subcarriers are used to transmit data and pilot; then N=18 and $N_{RB}$=864/

18=48). The subchannel for distributed resource allocation after the permutation has the same number of data subcarriers with the basic physical resource unit 200. In this way, the bandwidth allocation may be simplified, because the same resource granularity may be used regardless of distributed/localized resource allocation mode. Note that 802.16e has the similar property that FUSC/PUSC has the same data subcarriers per subchannel with AMC.

FIG. 3A shows slots within a physical resource unit allocated for pilots of a transmit antenna according to an example embodiment. Consider one basic physical resource unit 200. In the $k^{th}$ OFDMA symbol (k=0, 1, 2, ... M−1), assume that there are $n_k$ subcarriers used as pilot subcarriers, where k=0, 1, ... M−1 and $n_k$ is a non-negative integer less than N. Thus, the $k^{th}$ OFDMA symbol has N−$n_k$ data subcarriers, and the basic PHY RB has $$\sum_{k=0}^{M-1} (N - n_k)$$

data subcarriers. For example, at FIG. 3A, $n_0$=3 and N−$n_0$=15; $n_1$=0 and N−$n_1$=18.

SINGLE ANTENNA EXAMPLE/MODE. In this single antenna example, the number of subchannels after the permutation equals the number of physical resource units 200 $N_{RB}$. The data subcarriers of each subchannel may be selected from all the M OFDMA symbols. A specific basic permutation sequence with the length of $N_{RB}$ may be pre-defined and stored in the local memory of the base station and the subscriber stations. As an example, these could be Reed-Solomon sequence as in 802.16e, but this disclosure is not limited to a particular permutation sequence.

The data subcarriers may be selected for each $k^{th}$ OFDMA (where k=0, 1, 2, ... M−1) symbol serially (or in parallel) as follows. After allocating the $k^{th}$ OFDMA symbol with the pilot subcarriers, there may be $N_{RB}$*(N−$n_k$) data subcarriers in all remaining for that $k^{th}$ OFDMA symbol (e.g., at FIG. 3A for $n_0$, three subcarriers are allocated for pilots and so fifteen subcarriers remain for data). The data subcarriers may be renumbered from 0 to $N_{RB}$*(N−$n_k$)−1 for convenience.

Then the data subcarriers may be partitioned into N−$n_k$ groups of contiguous subcarriers. Each group may contain $N_{RB}$ subcarriers. For each subchannel of distributed resource allocation, one subcarrier may be selected from each of these groups based on the permutation sequence. In an example embodiment, the permutation sequence may be that of equation 76 of IEEE 802.16Rev2/D3 for FUSC/PUSC permutation:

$$\text{subcarrier}(k,s) = N_{subchannels} \cdot n_k + \{p_s[n_k \bmod N_{subchannels}] + DL\_PermBase\} \bmod N_{subchannels}$$

In this example, subcarrier(k, s) may be a subcarrier index of subcarrier k in subchannel s; s may be an index number of a subchannel, from the set [0 ... $N_{subchannels}$−1]; $n_k$ may be (k+13*s) mod $N_{subcarriers}$ where k is the subcarrier-in-subchannel index from the set [0 ... $N_{subcarriers}$−1]; $N_{subchannels}$ may be the number of subchannels (for PUSC, use number of subchannels in the currently partitioned major group); $p_s[j]$ may be the series obtained by rotating basic permutation sequence cyclically to the left s times; DL_PermBase may be an integer ranging from 0 to 31, which may be set to preamble IDCell in the first zone and determined by the DL-MAP for other zones. Numerical parameters may be given by the following table:

| Parameter | Value | Comments |
|---|---|---|
| Number of Used Subcarriers ($N_{used}$) | 1703 | Number of all subcarriers used within a symbol, including all possible allocated pilots and the DC carrier. |
| Pilots | — | — |
| VariableSet #0 | 71 | 0, 72, 144, 216, 288, 360, 432, 504, 576, 648, 720, 792, 864, 936, 1008, 1080, 1152, 1224, 1296, 1368, 1440, 1512, 1584, 1656, 48, 120, 192, 264, 336, 408, 480, 552, 624, 696, 768, 840, 912, 984, 1056, 1128, 1200, 1272, 1344, 1416, 1488, 1560, 1632, 24, 96, 168, 240, 312, 384, 456, 528, 600, 672, 744, 816, 888, 960, 1032, 1104, 1176, 1248, 1320, 1392, 1464, 1536, 1608, 1680 |
| ConstantSet #0 | 12 | 9, 153, 297, 441, 585, 729, 873, 1017, 1161, 1305, 1449, 1593 |
| VariableSet #1 | 71 | 36, 108, 180, 252, 324, 396, 468, 540, 612, 684, 756, 828, 900, 972, 1044, 1116, 1188, 1260, 1332, 1404, 1476, 1548, 1620, 1692, 12, 84, 156, 228, 300, 372, 444, 516, 588, 660, 732, 804, 876, 948, 1020, 1092, 1164, 1236, 1308, 1380, 1452, 1524, 1596, 1668, 60, 132, 204, 276, 348, 420, 492, 564, 636, , 708, 780, 852, 924, 996, 1068, 1140, 1212, 1284, 1356, 1428, 1500, 1572, 1644 |
| ConstantSet #1 | 12 | 81, 225, 369, 513, 657, 801, 945, 1089, 1233, 1377, 1521, 1665 |
| Number of data subcarriers | 1536 | — |
| Number of data subcarriers per subchannel | 48 | — |
| Number of Subchannels | 32 | — |
| Basis permutation sequence | — | 3, 18, 2, 8, 16, 10, 11, 15, 26, 22, 6, 9, 27, 20, 25, 1, 29, 7, 21, 5, 28, 31, 23, 17, 4, 24, 0, 13, 12, 19, 14, 30 |

Then, for each subchannel there may be N−$n_k$ subcarriers from the $k^{th}$ OFDMA symbol. Note that these N−$n_k$ data subcarriers may be spread over the whole available frequency band of the $k^{th}$ OFDMA symbol.

Consider the basic PHY RB of FIG. 3A as an example. For the first OFDMA symbol, N−$n_0$=15. There will therefore be 15 subcarriers (18-3) selected from this OFDMA symbol for each subchannel. For the second OFDMA symbol there are no pilots at all, so N−$n_1$=18−0=18. Thus, there will be 18 subcarriers selected for each subchannel from this OFDMA symbol.

After performing the processes described in paragraphs [0033], [0034], and [0036] for all of the M OFDMA symbols, a subchannel may result with the number of data subcarriers equivalent to $$\sum_{k=0}^{M-1}(N-n_k),$$

which may be the same as the number of data subcarriers in the basic physical resource unit 200. The data subcarriers may be spread over the whole frequency band of all the M OFDMA symbols.

FIG. 3B shows slots within a physical resource unit allocated for pilots of two transmit antennas according to an example embodiment.

MULTI-ANTENNA EXAMPLE/MODE. A variation of the single-antenna mode detailed above is presented for the exemplary MIMO case where SFBC is used. Specifically, when two transmit antennas are used, in the frequency domain every two adjacent subcarriers should be paired to transmit data when this diversity scheme is employed. When the approach of the single antenna mode above is used, adjacent subcarriers (in one OFDMA symbol) will be very probably selected by different subchannels, and thus may not meet the requirements of SFBC. MIMO (and its variant single input multiple output SIMO) is a multi-antenna technique that exploits diversity of the multi-antennas at the transmit and/or receive end of the communication air interface, and may employ differential antenna weighting and/or water filling-type techniques to account for different channel conditions experienced by the different antennas. For the two-antenna SFBC case, that each of the paired adjacent subcarriers may be within the same subchannel and so they remain paired when transmitted.

The variation to account for the particularities of SFBC and OFDMA symbol pairing may be as follows. Assume the SFBC is used for the MIMO case of two transmit antennas. In this case, $n_k$ and N are even numbers in general, as shown in FIG. 3B. A specific permutation sequence with the length of $N_{RB}$ may be pre-defined and stored in the local memory as above. For the $k^{th}$ OFDMA symbol (where k=0, 1, ..., M−1), after allocating the physical resource unit 200 for that $k^{th}$ symbol with the pilot subcarriers, there are $N_{RB}*(N-n_k)$ data subcarriers in all remaining. The data subcarriers are renumbered from 0 to $N_{RB}*(N-n_k)-1$ for convenience, as in the single antenna mode.

When SFBC of two transmit antennas is employed, the data subcarriers may then be partitioned in this variation into $(N-n_k)/2$ groups of contiguous subcarriers, where each group contains $N_{RB}$ pairs of subcarriers or $2N_{RB}$ subcarriers. Note that "one pair of subcarriers" here means one pair of frequency-adjacent subcarriers. For each subchannel, select one pair of subcarriers from each of these groups based on the permutation sequence (e.g., equation 76 referenced above). Note that if the permutation computation tells that the $i^{th}$ subcarrier should be selected from a group, then the $i^{th}$ paired subcarriers shall be selected in this step. Then, for each subchannel there will be $N-n_k$ subcarriers from the $k^{th}$ OFDMA symbol.

After doing the above for each of the M OFDMA symbols in the physical resource unit 200, the result is a subchannel with the number of data subcarriers equivalent to $$\sum_{k=0}^{M-1}(N-n_k),$$

which is the same as the number of data subcarriers in the basic unit 200.

For the more general SFBC, where the number of MIMO transmit antennas may be greater than two (e.g., Y antennas,) the proposed method may be extended to $(N-n_k)/X$ groups of contiguous subcarriers (X is not necessarily equal to Y), where each group contains a total of $X*N_{RB}$ subcarriers in subgroups of size X (where both X and Y are integers greater than one for MIMO mode). Each of the Y antennas should then transmit in all of the subcarriers, and the size-X subgroups of subcarriers in those subchannels remain grouped in the MIMO transmissions.

Certain advantages of the exemplary embodiments of the example embodiments described with reference to FIGS. 3A and 3B are summarized as follows:

In distributed resource allocation, the number of data subcarriers per subchannel is the same as the number of data subcarriers per physical resource unit 200 in localized resource allocation. This means the granularities of resource allocation for the two cases are the same.

The subcarriers of one subchannel in distributed resource allocation are spread over the whole frequency band in all the M OFDMA symbols, which ensures that the largest possible frequency-time diversity could be gained.

The same permutation sequence is used in all the M OFDMA symbols, though the numbers of available data subcarriers per OFDMA symbol are different. This point simplifies the implementation of permutation in 16m systems.

The permutation for multi-antenna cases is readily extendable as noted above.

Figure 3D:
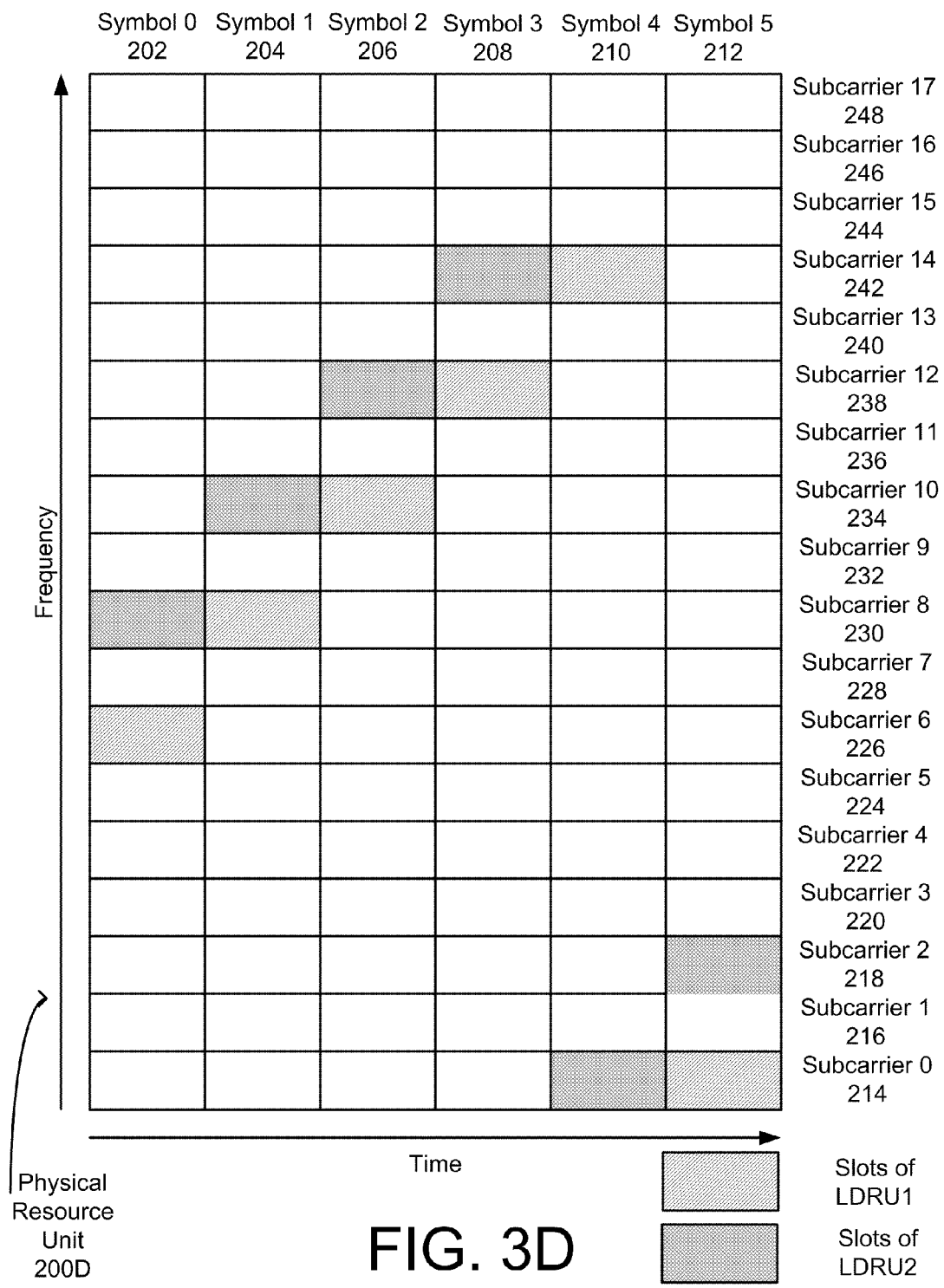

FIGS. 3C and 3D show a permutation of slots 250 to LDRUs within a first physical resource unit 200C and a second physical resource unit 200D according to an example embodiment. While two physical resource units 200C, 200D are shown in this example, an LDRU may include slots included in any number of physical resource units 200. The slots 250 included in an LDRU may be associated with successive OFDMA symbols 202, 204, 206, 208, 210, 212 separated by N subcarriers, N being an integer number of at least one, such as one, two, three, or four. As shown in this example, the slots 250 of each LDRU (in this example, a first LDRU denoted LDRU1 and a second LDRU denoted LDRU2) are each associated with a different OFDMA symbol 202, 204, 206, 208, 210, 212 and a different OFDMA subcarrier 214, 216, 218, 220, 222, 224, 226, 228, 230, 232, 234, 236, 238, 240, 242, 244, 246, 248.

In this example, LDRU1 includes, within physical resource unit 200C, a slot 250 at symbol 0 202 and subcarrier 1 216, a slot 250 at symbol 1 204 and subcarrier 3 220, a slot 250 at symbol 2 206 and subcarrier 5 224, a slot 250 at symbol 3 208 at subcarrier 7 228, a slot 250 at symbol 4 210 and subcarrier 9 232, and a slot 250 at symbol 5 212 and subcarrier 11 236, and within physical resource unit 200D, a slot 250 at symbol 0 202 and subcarrier 6 226, a slot 250 at symbol 1 204 and subcarrier 8 230, a slot 250 at symbol 2 206 and subcarrier 10 234, a slot 250 at symbol 3 208 at subcarrier 12 238, a slot 250 at symbol 4 210 and subcarrier 14 242, and a slot 250 at symbol 5 212 and subcarrier 10 214. Also in this example, LDRU2 includes, within physical resource unit 200C, a slot 250 at symbol 0 202 and subcarrier 11 236, a slot 250 at symbol 1 204 and subcarrier 13 240, a slot 250 at symbol 2 206 and subcarrier 15 244, a slot 250 at symbol 3 208 at subcarrier 1 216, a slot 250 at symbol 4 210 and subcarrier 3 220, and a slot 250 at symbol 5 212 and subcarrier 5 224, and within physical resource unit 200D, a slot 250 at symbol 0 202 and subcarrier 8 230, a slot 250 at symbol 1 204 and subcarrier 10 234, a slot 250 at symbol 2 206 and subcarrier 12 238, a slot 250 at symbol 3 208 at subcarrier 14 242, a slot 250 at symbol 4 210 and subcarrier 0 214, and a slot 250 at symbol 5 212 and subcarrier 2 218.

In an example embodiment, the slots 250 associated with successive OFDMA symbols 202, 204, 206, 208, 210, 212 and with subcarriers 214, 216, 218, 220, 222, 224, 226, 228, 230, 232, 234, 236, 238, 240, 242, 244, 246, 248 may be determined by the following equation:

Carrier$(s,m,t)$=$N_s$*k+mod($F(s,m,\text{perm\_seq})+f(t),N_s$)

In this example, Carrier$(s,m,t)$ may be a subcarrier index of an $m^{th}$ subcarrier in a $t^{th}$ OFDMA symbol in an $s^{th}$ LDRU, $N_s$ may be an integer, k may be an integer determined by s and m, F(s, m, perm_seq) may be a function with an integer value from 0 to $N_s-1$, f(t) may be an integer value, {mod(f(1), $N_s$), . . . , mod(f($N_{sym}-1$),$N_s$)} may be equally spread [0, $N_s-1$], and f(0)=0. perm_seq may be the permutation sequence calculated by "basic permutation sequence", DL_PermBase, s, and m, where DL_PermBase may be an integer.

In an example embodiment, the slots 250 associated with successive OFDMA symbols 202, 204, 206, 208, 210, 212 and with subcarriers 214, 216, 218, 220, 222, 224, 226, 228, 230, 232, 234, 236, 238, 240, 242, 244, 246, 248 may be determined by the following equation:

$$\text{Carrier}(s,m,t) = \begin{cases} N_s*k + \text{mod}([s + P_{1,c_1}(k') + P_{2,c_2}(k')] + at, N_s), \\ \quad 0 < c_1, c_2 < N_s \\ N_s*k + \text{mod}([s + P_{1,c_1}(k') + at, N_s]), \\ \quad c_1 \neq 0, c_2 = 0 \\ N_s*k + \text{mod}([s + P_{2,c_2}(k') + at, N_s]), \\ \quad c_1 = 0, c_2 \neq 0 \\ N_s*k + \text{mod}(s + at, N_s), c_1 = 0, c_2 = 0 \end{cases}$$

In this example, Carrier$(s,m,t)$ may be a subcarrier index of an $m^{th}$ subcarrier in a $t^{th}$ OFDMA symbol in an $s^{th}$ LDRU, $N_s$ may be an integer, k may be an integer determined by s and m, k' may be an integer determined by k, $P_{1c1}$ may be a $k'^{th}$ element of a sequence obtained by rotating basic permutation sequence $P_1$ cyclically to the left $c_1$ times, $P_{2c2}$ may be a $k'^{th}$ element of a sequence obtained by rotating basic permutation sequence $P_2$ cyclically to the left $c_2$ times, $c_1$=mod(DL_PermBase, $N_s$), and $c_2$=⌊DL_PermBase/$N_s$⌋. DL_PermBase may be an integer.

Figure 3E:
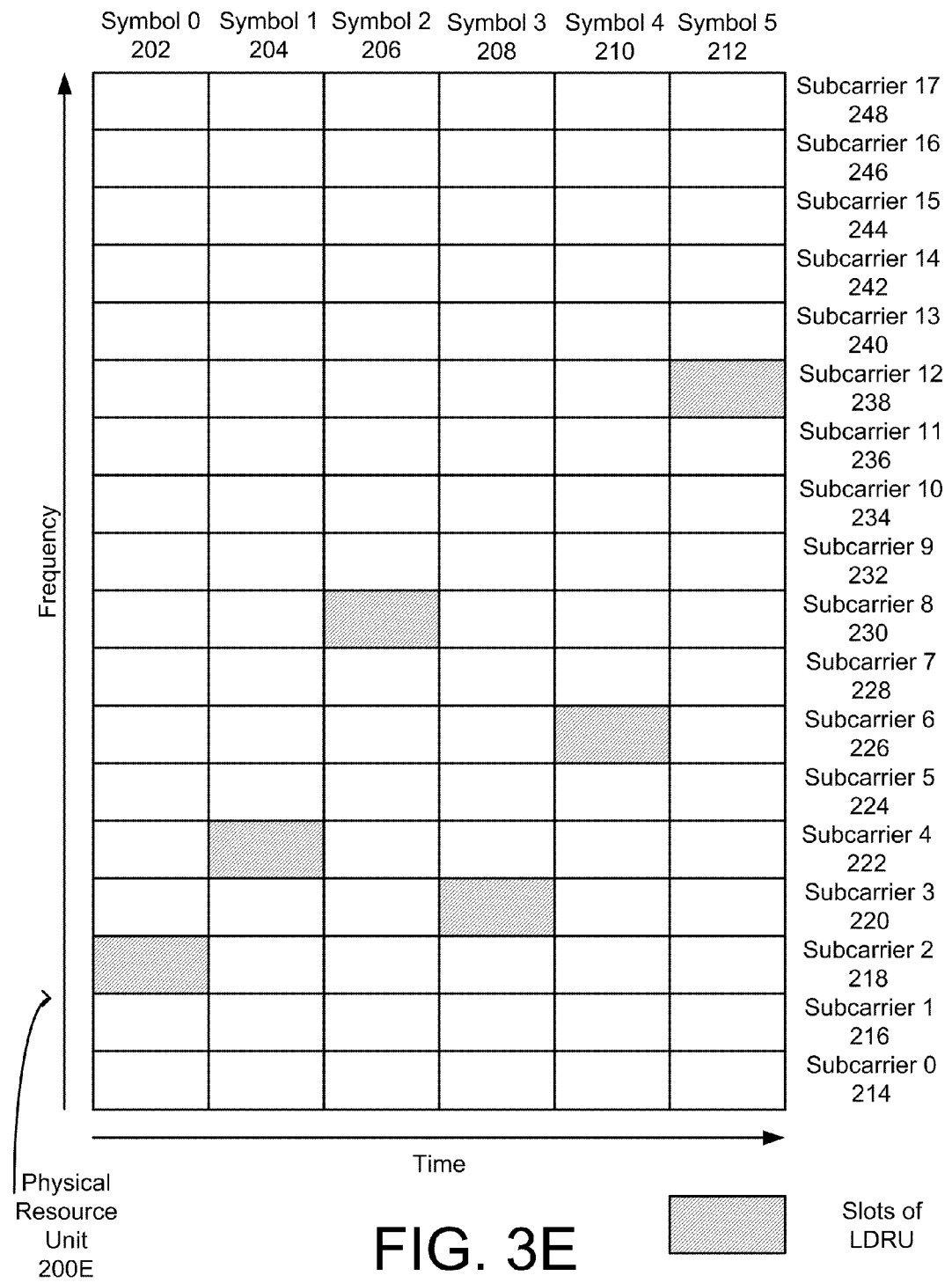
FIGS. 3E and 3F show a permutation of slots to an LDRU within a first physical resource unit and a second physical resource unit according to another example embodiment.
Figure 3F:
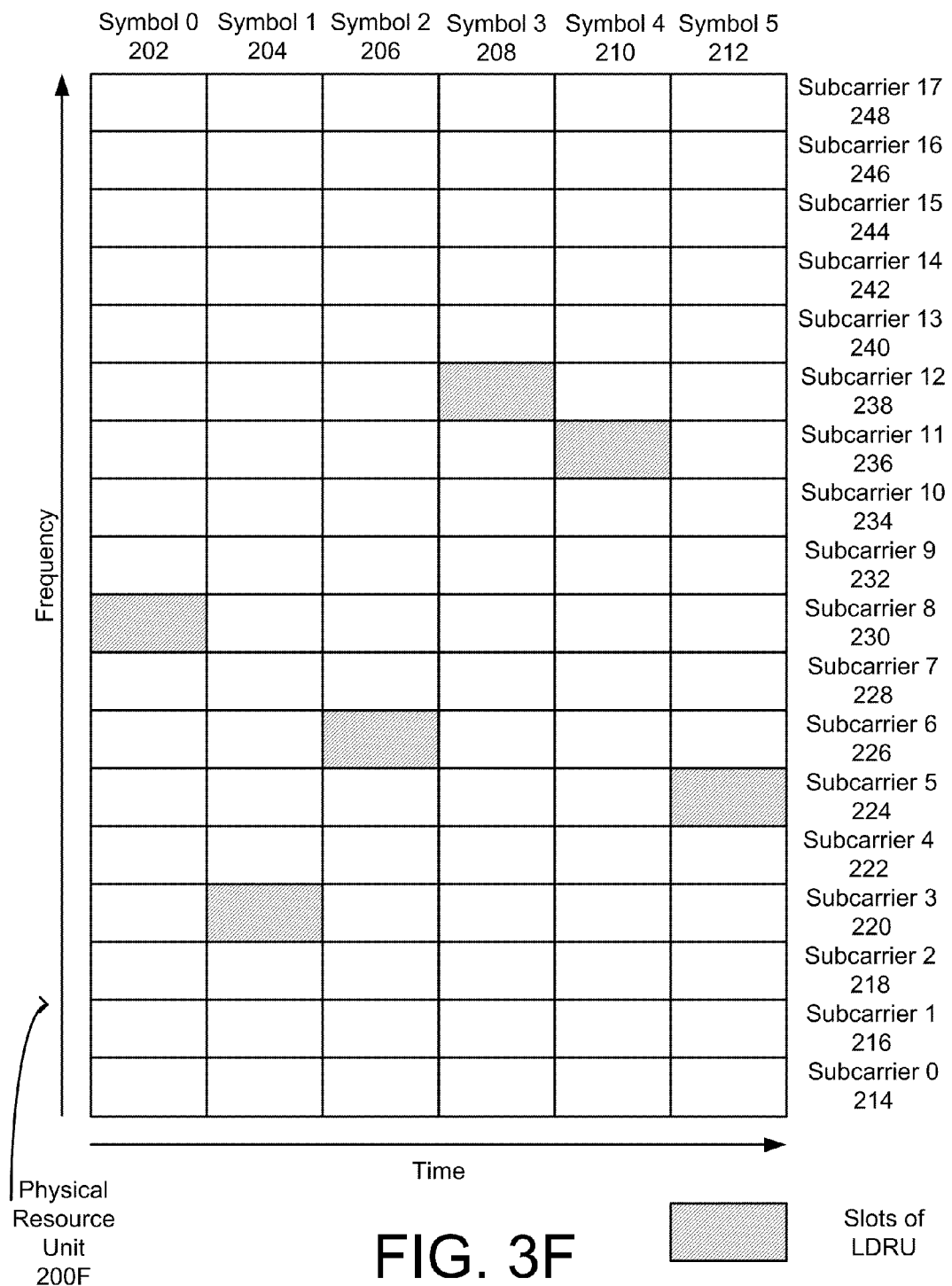

FIGS. 3E and 3F show a permutation of slots 250 to an LDRU within a first physical resource unit 200E and a second physical resource unit 200F according to another example embodiment. While two physical resource units 200E, 200F are shown in this example, an LDRU may include slots included in any number of physical resource units 200. The slots 250 included in an LDRU may be associated with successive OFDMA symbols 202, 204, 206, 208, 210, 212 and may be associated with subcarriers 214, 216, 218, 220, 222, 224, 226, 228, 230, 232, 234, 236, 238, 240, 242, 244, 246, 248 in a pseudorandom pattern. As shown in this example, the slots 250 of the LDRU are each associated with a different OFDMA symbol 202, 204, 206, 208, 210, 212 and a different OFDMA subcarrier 214, 216, 218, 220, 222, 224, 226, 228, 230, 232, 234, 236, 238, 240, 242, 244, 246, 248.

In the example shown in FIGS. 3E and 3F, the LDRU may include, within the physical resource unit 200E, a slot 250 at symbol 0 202 and subcarrier 2 218, a slot 250 at symbol 1 204 and subcarrier 4 222, a slot 250 at symbol 2 206 and subcarrier 8 230, a slot 250 at symbol 3 208 at subcarrier 3 222, a slot 250 at symbol 4 210 and subcarrier 6 226, and a slot 250 at symbol 5 212 and subcarrier 12 238, and within physical resource unit 200F, a slot 250 at symbol 0 202 and subcarrier 8 230, a slot 250 at symbol 1 204 and subcarrier 3 220, a slot 250 at symbol 2 206 and subcarrier 6 226, a slot 250 at symbol 3 208 at subcarrier 12 238, a slot 250 at symbol 4 210 and subcarrier 11 236, and a slot 250 at symbol 5 212 and subcarrier 10 224. This is merely an example, and other example permutations with pseudorandom associations of subchannels 214, 216, 218, 220, 222, 224, 226, 228, 230, 232, 234, 236, 238, 240, 242, 244, 246, 248 for each symbol 202, 204, 206, 208, 210, 212 within a physical resource unit 200 may be used.

In an example embodiment, the slots are associated with successive OFDMA symbols, and the slots are associated with subcarriers may be determined by:

Carrier$(s,m,t)$=$N_s$*k+F$(s,m,g(\text{perm\_seq}, t))$

In this example, Carrier$(s,m,t)$ may be a subcarrier index of an $m^{th}$ subcarrier in a $t^{th}$ OFDMA symbol in an $s^{th}$ LDRU, $N_s$ may be an integer, k may be an integer determined by s and m, and g (perm_seq, t) may be a permutation sequence derived by perm_seq and t.

In an example embodiment, the slots are associated with successive OFDMA symbols, and the slots are associated with subcarriers may be determined by:

$$\text{Carrier}(s, m, t) = \begin{cases} N_s*k + [s + P_{1,c_1}(k') + P_{2,c_2}(k')], \\ \quad 0 < c_1, c_2 < N_s \\ N_s*k + [s + P_{1,c_1}(k')], c_1 \neq 0, c_2 = 0 \\ N_s*k + [s + P_{2,c_2}(k')], c_1 = 0, c_2 \neq 0 \\ N_s*k + s, c_1 = 0, c_2 = 0 \end{cases}$$

In this example, Carrier$(s,m,t)$ may be a subcarrier index of an $m^{th}$ subcarrier in a $t^{th}$ OFDMA symbol in an $s^{th}$ LDRU, $N_s$ may be an integer, k may be an integer determined by s and m, k' may be an integer determined by k and t, e.g. k'=mod(k+t, $N_s-1$), $P_{1c1}$ may be a $k'^{th}$ element of a sequence obtained by rotating basic permutation sequence $P_1$ cyclically to the left $c_1$ times, $P_{2c2}$ may be a $k'^{th}$ element of a sequence obtained by rotating basic permutation sequence $P_2$ cyclically to the left $c_2$ times, $c_1$=mod(DL_PermBase, $N_s$), and $c_2$=⌊DL_PermBase/$N_s$⌋. DL_PermBase may be an integer.

The wireless network 102, such as via the superordinate station 104, may allocate a number of LDRUs to each of the mobile stations 106, 108, 110, 112, 114, 116 for uplink and/or downlink communication based on a determined need of the mobile station 106, 108, 110, 112, 114, 116. The superordinate station 104 may assign or allocate a number of LDRUs to each of the mobile stations 106, 108, 110, 112, 114, 116 based on the determined need according to an adaptive modulation and encoding scheme. The determined need may be based on channel or radio link conditions; for example, where the channel conditions are good, a modulation scheme with a high coding rate such as 16QAM or 64QAM may be used, with fewer LDRUs needing to be allocated for a given data rate. Similarly, in cases of poor channel or radio link conditions, lower coding rate modulation schemes, such as BPSK or QPSK, may be used, which may require more LDRUs to be allocated to a given mobile station 106, 108, 110, 112, 114, 116 for a given data rate. The superordinate station 104 may also determine the number of LDRUs to assign to each mobile station 106, 108, 110, 112, 114, 116 based on other factors, such as the type of data to be transmitted, a priority level of the user, fairness considerations, or other factors.

The superordinate station 104 may allocate the LDRUs, which are mapped to slots 250 within physical resource units 200, to the mobile stations 106, 108, 110, 112, 114, 116 by sending allocation messages to the mobile stations 106, 108, 110, 112, 114, 116. The superordinate station 104 may allocate the LDRUs to the mobile stations 106, 108, 110, 112, 114, 116 by broadcasting a single allocation message which includes LDRU allocations for all the mobile stations 106, 108, 110, 112, 114, 116, or may send a separate allocation message allocating LDRUs to each of the mobile stations 106, 108, 110, 112, 114, 116. The superordinate station 104 may allocate LDRUs for both uplink and downlink communication in a single allocation message, or may send separate allocation messages allocating LDRUs for uplink and downlink communication. In an example embodiment, the allocation messages may be MAP Information Elements (MAP IEs).

Figure 4:
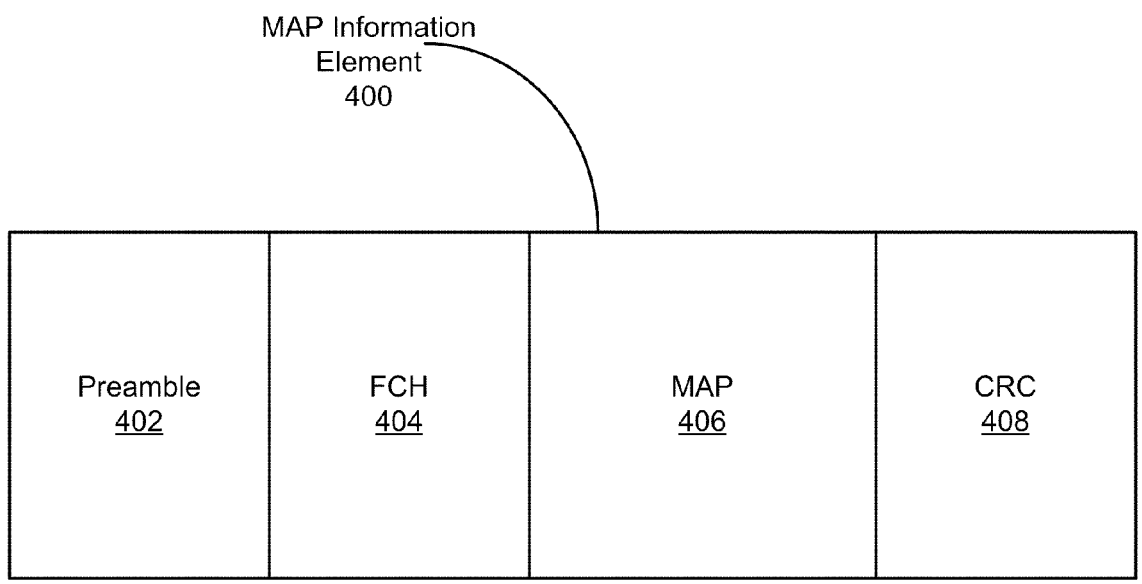
FIG. 4 shows a MAP Information Element frame according to an example embodiment.

FIG. 4 shows a MAP Information Element (MAP IE) 400 frame according to an example embodiment. The superordinate node 104 may send the MAP IE 400 to the mobile stations 106, 108, 110, 112, 114, 116, thereby allocating the LDRUs to the mobile stations 106, 108, 110, 112, 114, 116.

The MAP IE 400 may include a preamble field 402. The preamble field 402 may include signals and/or data which allow the mobile stations 106, 108, 110, 112, 114, 116 to perform amplifier adjustments, frequency correction, time correction, and/or channel estimation. The MAP IE 400 may also include a frame control header (FCH) 404. The FCH 404 may specify a burst profile and a length of one or more DL bursts which may follow the FCH 404. The FCH 404 may also include signals and/or data which the mobile station 106, 108, 110, 112, 114, 116 may decode to determine whether the MAP IE allocates LDRUs for the respective mobile station 106, 108, 110, 112, 114, 116, or for another mobile station 106, 108, 110, 112, 114, 116.

The MAP IE 400 may also include a MAP field 406. The MAP field 406 may indicate the LDRUs which are allocated to the respective mobile station 106, 108, 110, 112, 114, 116. The MAP IE 400 may also include a cyclic redundancy check (CRC) field 408. The CRC field 408 may include signals and/or data which, when decoded, may be used to determine whether the data in the MAP IE 400 were correctly received or not correctly received.

Figure 5:
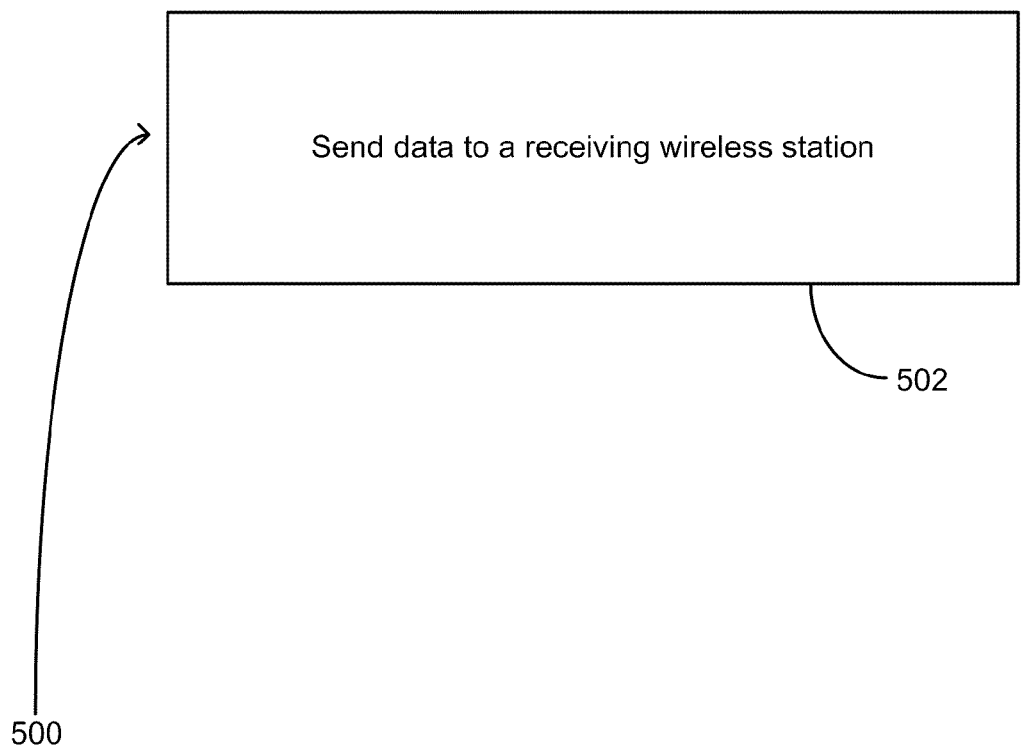
FIG. 5 shows a method according to an example embodiment.

FIG. 5 is a flowchart showing a method 500 according to an example embodiment. According to this example, the method 500 may include sending, by a sending wireless station in a wireless network, data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier (502).

According to an example embodiment, the at least one PRU may include six OFDMA symbols and eighteen OFDMA subcarriers.

According to an example embodiment, the slots may be associated with successive OFDMA symbols separated by N subcarriers, N being an integer number of at least one.

According to an example embodiment, the slots may be associated with successive OFDMA symbols, and the slots may be associated with subcarriers determined by:

$$\text{Carrier}(s,m,t) = N_s * k + \text{mod}(F(s,m,\text{perm\_seq}) + f(t), N_s)$$

wherein Carrier (s,m,t) may be a subcarrier index of an $m^{th}$ subcarrier in a $t^{th}$ OFDMA symbol in an $s^{th}$ LDRU, $N_s$ may be an integer, k may be an integer determined by s and m, F(s,m,perm_seq) may be a function with an integer value from 0 to $N_s-1$, perm_seq may be a permutation sequence calculated by "basic permutation sequence", DL_PermBase, s, and m, where DL_PermBase is an integer, and f(t) may be an integer value.

According to an example embodiment, the slots may be associated with successive OFDMA symbols, and the slots may be associated with subcarriers determined by:

$$\text{Carrier}(s, m, t) = \begin{cases} N_s * k + \text{mod}([s + P_{1,c_1}(k') + P_{2,c_2}(k')] + at, N_s), \\ \quad 0 < c_1, c_2 < N_s \\ N_s * k + \text{mod}([s + P_{1,c_1}(k')] + at, N_1), \\ \quad c_1 \neq 0, c_2 = 0 \\ N_s * k + \text{mod}([s + P_{2,c_2}(k')] + at, N_s), \\ \quad c_1 = 0, c_2 \neq 0 \\ N_s * k + \text{mod}(s + at, N_s), c_1 = 0, c_2 = 0 \end{cases}$$

wherein Carrier (s,m,t) may be a subcarrier index of an $m^{th}$ subcarrier in a $t^{th}$ OFDMA symbol in an $s^{th}$ LDRU, $N_s$ may be an integer, k may be an integer determined by s and m, k' may be an integer determined by k, $P_{1,c_1}$ may be a $k'^{th}$ element of a sequence obtained by rotating basic permutation sequence $P_1$ cyclically to the left $c_1$ times, $P_{2,c_2}$ may be a $k'^{th}$ element of a sequence obtained by rotating basic permutation sequence $P_2$ cyclically to the left $c_2$ times, $c_1=\text{mod}(\text{DL\_PermBase}, N_s)$, and $c_2=\lfloor \text{DL\_PermBase}/N_s \rfloor$.

According to an example embodiment, the slots may be associated with successive OFDMA symbols, and with pseudorandomly assigned subcarriers.

According to an example embodiment, the slots may be associated with successive OFDMA symbols, and the slots are associated with subcarriers determined by:

$$\text{Carrier}(s,m,t) = N_s * k + F(s,m,g(\text{perm\_seq}, t))$$

wherein Carrier (s,m,t) may be a subcarrier index of an $m^{th}$ subcarrier in a $t^{th}$ OFDMA symbol in an $s^{th}$ LDRU, $N_s$ may be an integer, k may be an integer determined by s and m, and g (perm_seq, t) may be a permutation sequence derived by perm_seq and t.

According to an example embodiment, the slots may be associated with successive OFDMA symbols, and the slots may be associated with subcarriers determined by:

$$\text{Carrier}(s, m, t) = \begin{cases} N_s * k + [s + P_{1,c_1}(k') + P_{2,c_2}(k')], 0 < c_1, c_2 < N_s \\ N_s * k + [s + P_{1,c_1}(k')], c_1 \neq 0, c_2 = 0 \\ N_s * k + [s + P_{2,c_2}(k')], c_1 = 0, c_2 \neq 0 \\ N_s * k + s, c_1 = 0, c_2 = 0 \end{cases}$$

wherein Carrier(s,m,t) may be a subcarrier index of an $m^{th}$ subcarrier in a $t^{th}$ OFDMA symbol in an $s^{th}$ LDRU, $N_s$ may be an integer, k may be an integer determined by s and m, k' may be an integer determined by k and t, e.g. k'=mod(k+t,$N_s-1$), $P_{1,c_1}$ may be a $k'^{th}$ element of a sequence obtained by rotating basic permutation sequence $P_1$ cyclically to the left $c_1$ times, $P_{2c2}$ may be a $k^{th}$ element of a sequence obtained by rotating basic permutation sequence $P_2$ cyclically to the left $c_2$ times, $c_1$=mod(DL_PermBase, $N_s$), and $c_2$=$\lfloor$DL_PermBase/$N_s\rfloor$.

According to an example embodiment, the method 500 may further comprise permuting the slots to the at least one LDRU.

According to an example embodiment, the method 500 may further comprise permuting the slots to the at least one LDRU, and sending at least one allocation message allocating the LDRU to the receiving wireless station.

According to an example embodiment, the method 500 may further comprise receiving at least one allocation message allocating the LDRU to the sending wireless station.

According to an example embodiment, the sending wireless station may include an IEEE 802.16 Worldwide Interoperability for Microwave Access (WiMAX) base station.

According to an example embodiment, the sending wireless station may include an IEEE 802.16 Worldwide Interoperability for Microwave Access (WiMAX) relay station.

According to an example embodiment, the sending wireless station may include an IEEE 802.16 Worldwide Interoperability for Microwave Access (WiMAX) mobile station.

According to an example embodiment, each of the slots may include an orthogonal frequency division multiple access (OFDMA) symbol in a time domain and a subcarrier in a frequency domain.

Figure 6:
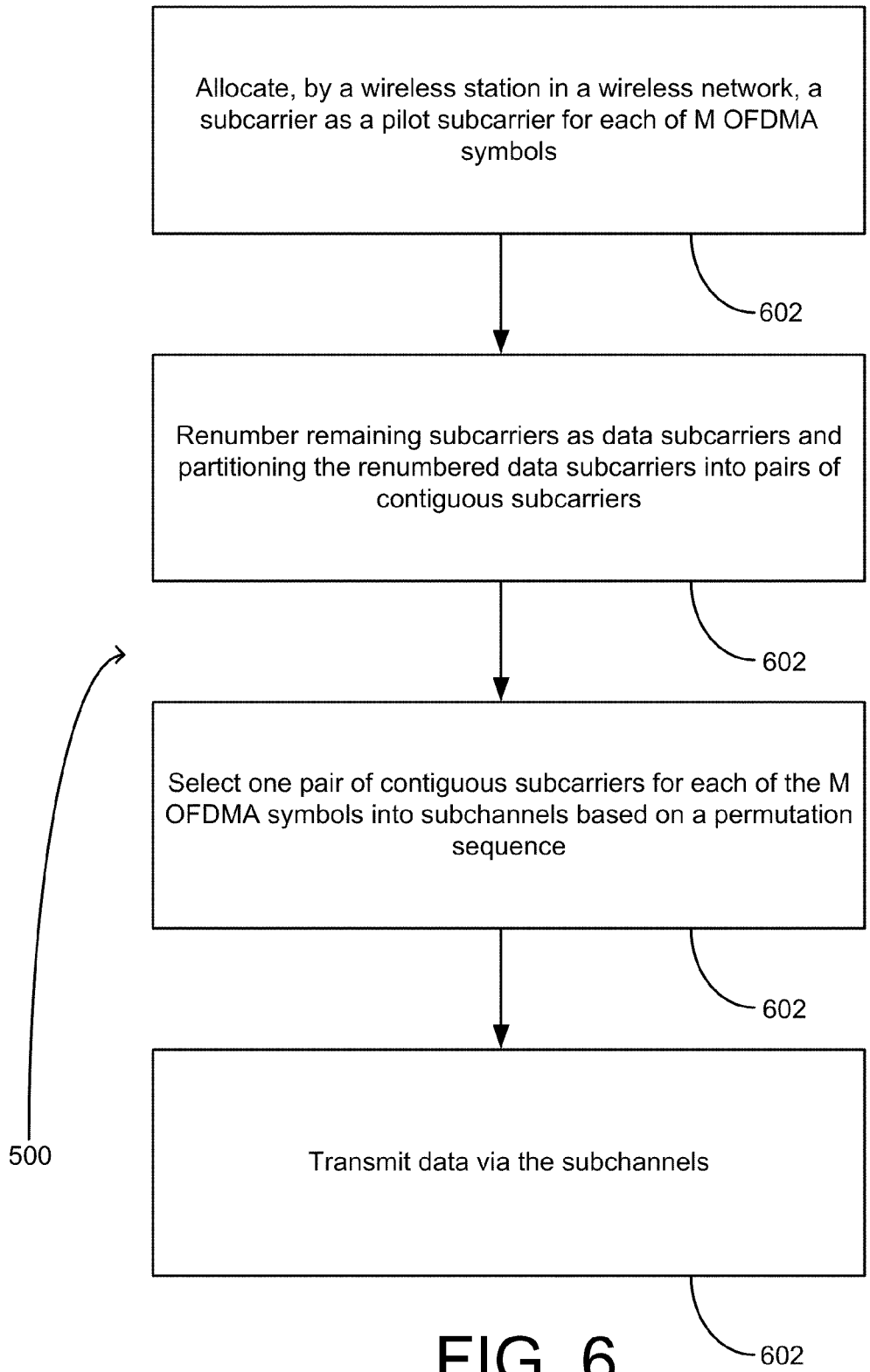
FIG. 6 shows a method according to another example embodiment.

FIG. 6 is a flowchart showing a method 600 according to another example embodiment. According to this example, the method 600 may include allocating, by a wireless station in a wireless network, a subcarrier as a pilot subcarrier for each of M OFDMA symbols (602). The method 600 may also include renumbering remaining subcarriers as data subcarriers and partitioning the renumbered data subcarriers into pairs of contiguous subcarriers (604). The method 600 may also include selecting one pair of contiguous subcarriers for each of the M OFDMA symbols into subchannels based on a permutation sequence (606). The method 600 may also include transmitting data via the subchannels (608).

Figure 7:
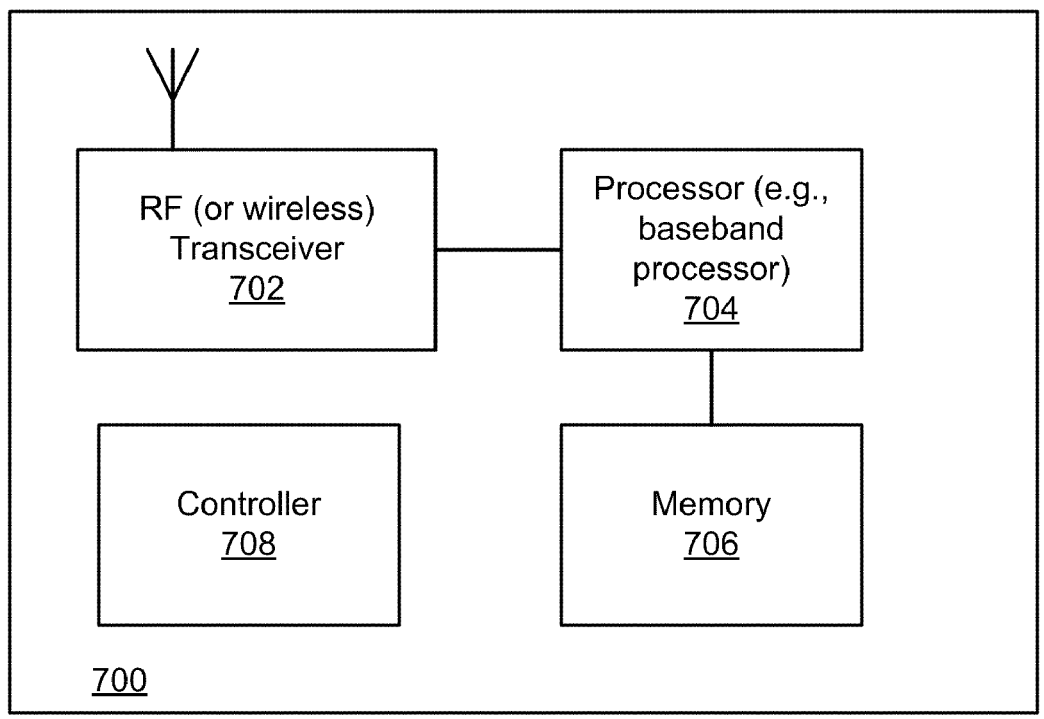
FIG. 7 shows a wireless station according to an example embodiment.

FIG. 7 is a block diagram of a wireless station (or wireless node) 700 according to an example embodiment. The wireless station 600 (e.g., superordinate station 104 or mobile station 106, 108, 110, 112, 114, 116) may include, for example, an RF (radio frequency) or wireless transceiver 702, including a transmitter to transmit signals and a receiver to receive signals, a processor 704 to execute instructions or software and control transmission and receptions of signals, and a memory 706 to store data and/or instructions.

Processor 704 may also make decisions or determinations, generate frames or messages for transmission, decode received frames or messages for further processing, and other tasks or functions described herein. Processor 704, which may be a baseband processor, for example, may generate messages, packets, frames or other signals (such as those described above) for transmission via wireless transceiver 702. Processor 704 may control transmission of signals or messages over a wireless network, and may receive signals or messages, etc., via a wireless network (e.g., after being downconverted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium such as the memory 706 may be provided that includes stored instructions, which when executed by a controller or processor may result in the processor 704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
sending, by a sending wireless station in a wireless network, data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier,
wherein the slots are associated with successive OFDMA symbols, and the slots are associated with subcarriers determined by:

$$\text{Carrier}(s,m,t)=N_s*k+\text{mod}(F(s,m,\text{perm\_seq})+f(t), N_s)$$

wherein Carrier(s,m,t) is a subcarrier index of an $m^{th}$ subcarrier in a $t^{th}$ OFDMA symbol in an $s^{th}$ LDRU,
wherein $N_s$ is an integer,
wherein k is an integer determined by s and m,
wherein F(s,m,perm_seq) is a function with an integer value from 0 to $N_s-1$,
wherein perm_seq is a permutation sequence calculated by "basic permutation sequence", DL_PermBase, s, and m, where DL_PermBase is an integer, and
wherein f(t) is an integer value.

2. The method of claim 1, wherein the at least one PRU includes six OFDMA symbols and eighteen OFDMA subcarriers.

3. The method of claim 1, wherein the slots are associated with successive OFDMA symbols separated by N subcarriers, N being an integer number of at least one.

4. The method of claim 1, wherein the slots are associated with successive OFDMA symbols, and with pseudorandomly assigned subcarriers.

5. The method of claim 1, further comprising permuting the slots to the at least one LDRU.

6. The method of claim 1, further comprising:
permuting the slots to the at least one LDRU; and
sending at least one allocation message allocating the LDRU to the receiving wireless station.

7. The method of claim 1, further comprising receiving at least one allocation message allocating the LDRU to the sending wireless station.

8. The method of claim 1, wherein the sending wireless station includes an IEEE 802.16 Worldwide Interoperability for Microwave Access (WiMAX) base station.

9. The method of claim 1, wherein the sending wireless station includes an IEEE 802.16 Worldwide Interoperability for Microwave Access (WiMAX) relay station.

10. The method of claim 1, wherein the sending wireless station includes an IEEE 802.16 Worldwide Interoperability for Microwave Access (WiMAX) mobile station.

11. The method of claim 1, wherein each of the slots includes an orthogonal frequency division multiple access (OFDMA) symbol in a time domain and a subcarrier in a frequency domain.

12. A method comprising:
sending, by a sending wireless station in a wireless network, data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier,
wherein the slots are associated with successive OFDMA symbols, and the slots are associated with subcarriers determined by:

$$\text{Carrier}(s,m,t)=N_s*k+F(s,m,g(\text{perm\_seq}, t))$$

wherein Carrier(s,m,t) is a subcarrier index of an $m^{th}$ subcarrier in a $t^{th}$ OFDMA symbol in an $s^{th}$ LDRU,
wherein $N_s$ is an integer,
wherein k is an integer determined by s and m, and
wherein g(perm_seq, t) is a permutation sequence derived by perm_seq and t.

13. The method of claim 12, wherein the at least one PRU includes six OFDMA symbols and eighteen OFDMA subcarriers.

14. The method of claim 12, further comprising permuting the slots to the at least one LDRU.

15. The method of claim 12, further comprising:
permuting the slots to the at least one LDRU; and
sending at least one allocation message allocating the LDRU to the receiving wireless station.

16. An apparatus comprising:
a processor, the processor being configured to:
generate a message including data for a wireless transceiver to send to a wireless station over an air interface via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier,
wherein the slots are associated with successive OFDMA symbols, and the slots are associated with subcarriers determined by:

$$\text{Carrier}(s,m,t)=N_s*k+\text{mod}(F(s,m,\text{perm\_seq})+f(t), N_s)$$

wherein Carrier(s,m,t) is a subcarrier index of an $m^{th}$ subcarrier in a $t^{th}$ OFDMA symbol in an $s^{th}$ LDRU,
wherein $N_s$ is an integer,
wherein k is an integer determined by s and m,
wherein F(s,m,perm_seq) is a function with an integer value from 0 to $N_s-1$, wherein perm_seq is a permutation sequence calculated by "basic permutation sequence", DL_PermBase, s, and m, where DL_PermBase is an integer, and wherein f(t) is an integer value.

17. The apparatus of claim 16, wherein the at least one PRU includes six OFDMA symbols and eighteen OFDMA subcarriers.

18. The apparatus of claim 16, wherein the processor is further configured to permute the slots to the at least one LDRU.

19. The apparatus of claim 16, wherein the processor is further configured to:
   permute the slots to the at least one LDRU; and
   send at least one allocation message allocating the LDRU to the receiving wireless station.

20. A computer program product for a sending wireless station in a wireless network, the computer program product being tangibly embodied on a computer storage medium and including executable code that, when executed, is configured to cause the sending wireless station to:
   send data to a receiving wireless station, the data being sent via at least one logical distributed resource unit (LDRU), the LDRU including slots included in at least one physical resource unit (PRU), each of the slots included in the at least one PRU being associated with a different orthogonal frequency division multiple access (OFDMA) symbol and a different OFDMA subcarrier, wherein the slots are associated with successive OFDMA symbols, and the slots are associated with subcarriers determined by:

$$\text{Carrier}(s,m,t)=N_s*k+\text{mod}(F(s,m,\text{perm\_seq})+f(t), N_s)$$

wherein Carrier(s,m,t) is a subcarrier index of an $m^{th}$ subcarrier in a $t^{th}$ OFDMA symbol in an $s^{th}$ LDRU,
wherein $N_s$ is an integer,
wherein k is an integer determined by s and m,
wherein F(s,m,perm_seq) is a function with an integer value from 0 to $N_s-1$,
wherein perm_seq is a permutation sequence calculated by "basic permutation sequence", DL_PermBase, s, and m, where DL_PermBase is an integer, and
wherein f(t) is an integer value.

* * * * *